United States Patent [19]
Yamamoto et al.

[11] Patent Number: 4,811,114
[45] Date of Patent: Mar. 7, 1989

[54] IMAGE READING APPARATUS

[75] Inventors: Hiroyuki Yamamoto; Toshifumi Isobe, both of Hachioji, Japan

[73] Assignee: Konishiroku Photo Industry Co., Ltd., Tokyo, Japan

[21] Appl. No.: 14,453

[22] Filed: Feb. 13, 1987

[30] Foreign Application Priority Data

Feb. 24, 1986 [JP] Japan .................................. 61-38672

[51] Int. Cl.$^4$ ........................ H04N 1/10; H04N 1/46
[52] U.S. Cl. ..................................... 358/280; 358/51; 358/75; 358/293; 358/294
[58] Field of Search .................... 358/75, 51, 280, 293, 358/294

[56] References Cited

U.S. PATENT DOCUMENTS

| 4,593,311 | 6/1986 | Levine | 358/51 |
| 4,667,227 | 5/1987 | Ikeda | 358/51 |

FOREIGN PATENT DOCUMENTS 56-162755 12/1981 Japan .
57-44825 3/1982 Japan .

OTHER PUBLICATIONS

Nippon Telegraph and Telephone Public Corporation at All-Japan Meeting of Institute of Electronics and Electrical Communication Engineers of Japan in 1982.

Primary Examiner—Howard W. Britton
Attorney, Agent, or Firm—Frishauf, Holtz, Goodman & Woodward

[57] ABSTRACT

An image reading apparatus for reading an image by using a plurality of image pickup elements, wherein the relative deviation of reading positions between the image pickup elements is detected from read outputs of the image pickup elements and the read outputs are corrected in response to the relative deviation. The image reading apparatus has a memory device for memorizing reading signals of the image pickup elements and a correcting device for controlling application of the reading signals to the memory device and an output of the memory device by the relative deviation.

10 Claims, 7 Drawing Sheets

IMAGE READING APPARATUS

BACKGROUND OF THE INVENTION

1. Field of the Invention

The present invention relates to an image reading apparatus and, more particularly, to an image reading apparatus which is the most appropriate for a color printer for forming a color image on an image retainer by electrophotography.

2. Description of the Prior Art

With the wider spread of color image devices such as a color CRT display for a computer and a videotex terminal equipment, demand for color hard copies has increased. This demand for color copies with has also increased due to with the increase in the percentage of the wholly or partially colored copies in various documents in business affairs. Means for making color hard copies is desired to be inexpensive, quick and simple to handle. These conditions are known to be satisfied by a wire dot matrix recorder, an ink jet recorder, a heat transfer recorder, an electrostatic recorder or an electrophotography.

Of these, the electrophotography is advantageous over the other types in that it can easily attain a high resolution of 16 dots/mm, or more, and can record at a high speed, although it is difficult to have a small size because it is equipped with a developing device handling a photosensitive member and powder or liquid.

In one method for that electrophotography, the photosensitive member is exposed to a document through a color filter by a color reader and is developed with a developer of a color complementary to the color of the filter used.

In another method conceivable, a document image is projected through a color filter on photoelectric conversion elements arrayed one-dimensionally like a line sensor, from which an electric output is extracted, and a laser beam is modulated by this signal to make a record in each color by the electrophotography. This is basically identical to the color image treating technique, in a broad sense, which is used in a image signal processing such as a color printing or a color scanner. For forming an image, more specifically, the primaries (B, G and R) are separated to obtain information on three colors, which are arbitrarily combined to perform color reproduction and development.

Not only the method of obtaining the individual color information by separating the color into the primaries but also several methods have been disclosed for obtaining read signals for specified colors by separating a color into two colors and reading them. The latter methods are exemplified by Japanese Patent Laid-Open No. 162755/1981, Japanese Patent Publication No. 44825/1982, as shown in FIG. 20, and the technique reported by the Nippon Telegraph and Telephone Public Corporation at an all-Japan meeting of The Institute of Electronics and Electrical Communication Engineers of Japan in 1982, as shown in FIG. 19.

In another method, a color is separated into two colors through a half mirror and a filter, and color signals are obtained on the basis of those outputs of a one-dimensional photosensor, which in turn are obtained from the two colors, as shown in FIGS. 14 and 15.

According to these methods, a document is separated into two red and blue color components by combining a half mirror and a color filter, and these color components are photoelectrically converted to produce output values by photoelectric conversion means such as CCD. Voltages obtained by normalizing the output values with respect to an output value of white paper are denoted at Vr and Vb, respectively. In the method shown in FIG. 14, the voltages Vr and Vb are plotted on the ordinate and abscissa of the coordinate, respectively. Individual color signals of black, white, blue-green, purple, red-orange and yellow are obtained as the outputs. In the method shown in FIG. 15, individual color signals of black, white, blue, green and red are extracted as hue signals by plotting $(Va+Vb)$ as a luminance signal on the ordinate and $(\log Va - \log Vb)$ as a hue signal on the abscissa.

In the method of obtaining the individual color information by projecting a document image on the photoelectric conversion elements through the filter to separate it into the two or three colors, the photoelectric conversion elements are provided for the color components, respectively. These photoelectric conversion elements of the respective color components will raise a problem if they are relatively deviated. This is because the positionally deviated picture elements will produce erroneous color signals. Even if those deviations occur at a portion or end of the image, the color image forming apparatus is accompanied by a problem that a color having no relation to the document image is reproduced to irritate the sense of vision uncomfortably.

SUMMARY OF THE INVENTION

The present invention has been conceived in view of the problems described above and has an object to correcting the positional deviation between two or more image pickup elements of an image reading apparatus for reading an image by using the image pickup elements. In order to achieve this object, an image reading apparatus of the present invention is constructed to comprise detecting means for detecting the relative deviation of the reading positions between said image pickup elements from read outputs, and correcting means for correcting said read outputs in response to the output of said detecting means.

Other objects and features of the present invention will become apparent from the following description to be made with reference to the accompanying drawings.

DESCRIPTION OF THE PREFERRED EMBODIMENTS

The present invention will be described in the following with reference to the accompanying drawings.

Figure 1:
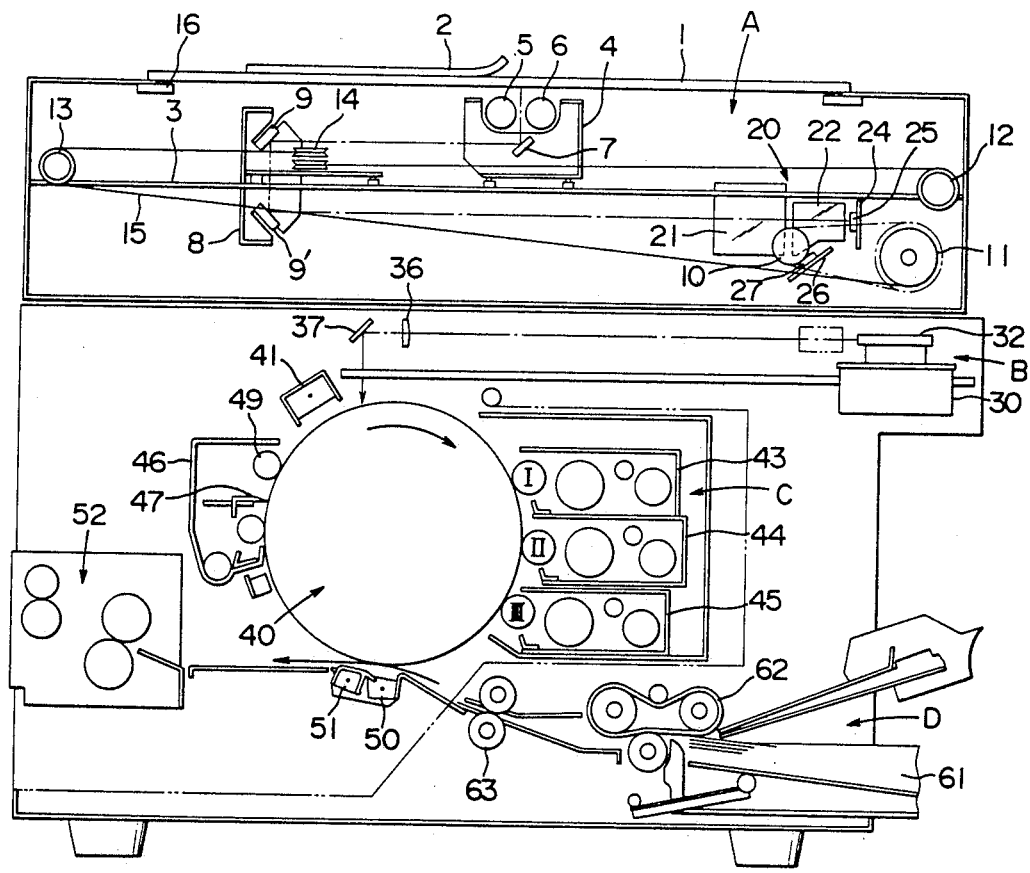
FIG. 1 is a schematic view showing the construction of a color image forming apparatus according to the present invention.

With reference to FIG. 1 showing the construction of an image forming apparatus utilizing an image reading device according to the present invention, a color image is formed, as will be described in the following.

Figure 2:
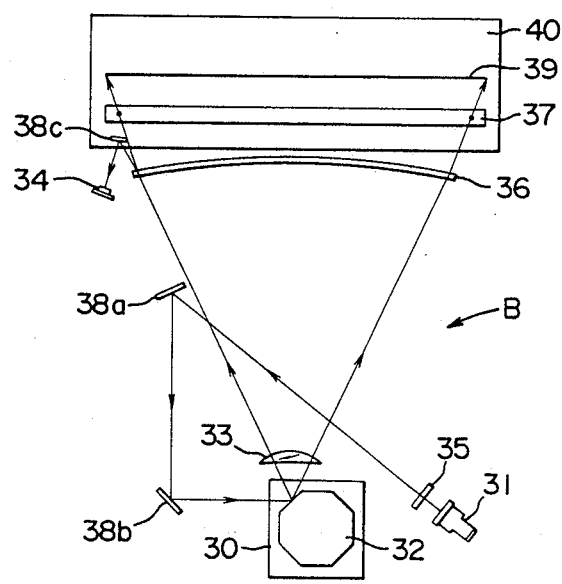
FIG. 2 is a schematic view showing a writing unit B of FIG. 1.
Figure 3:
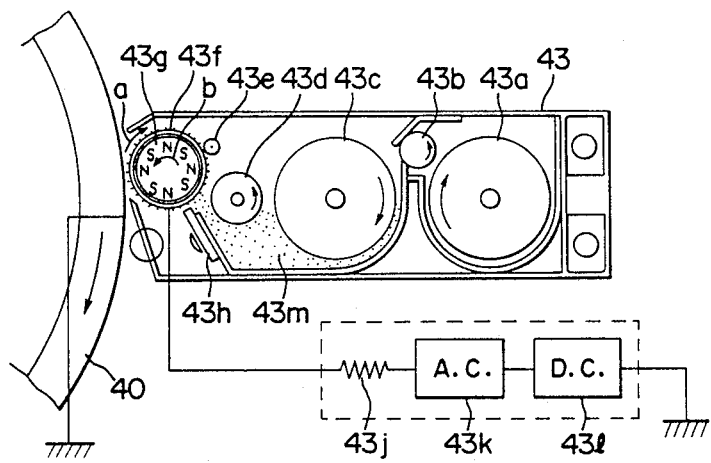
FIG. 3 is a section showing a developing device of FIG. 1.

In FIG. 1 reference letter A denotes a reading unit, letter B a writing unit, letter C an image forming unit, and letter D a paper feed unit. FIG. 2 is a top plan view showing the arrangement of internal elements of the writing unit B, and FIG. 3 is a sectional view showing the construction of a developing device to be used in the apparatus according to the present invention.

In the reading unit A, reference numeral 1 denotes a platen glass, on which is placed a document 2. This document 2 is illuminated by fluorescent lamps 5 and 6 which are carried on a carriage 4 moving on slide rails 3. A moving mirror unit 8 is equipped with mirrors 9 and 9' and is made movable on the slide rails 3. The mirror unit 8 is combined with a first mirror 7 to extract an optical image of the document 2 on the platen glass 1 to a lens reading unit 20.

Figure 11:
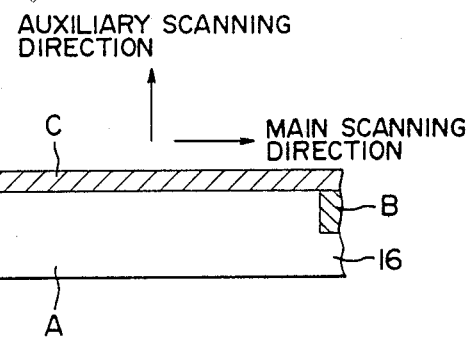
FIG. 11 is a front elevation showing a position detecting plate used in the image reading device according to the present invention.

The carriage 4 and the movable mirror unit 8 are driven at speeds V and ½V, respectively, in an identical direction by pulleys 11, 12, 13 and 14 which in turn are driven by a stepping motor 10 through a wire 15. The platen glass 1 is equipped on the back of its end portion with a position detecting plate 16 which is constructed to generate a standard white signal before the start of a document reading scan. This position detecting plate 16 is equipped with a standard white portion A and black portions B and C, as shown in FIG. 11, to generate a later-described alignment correcting boundary signal on the boundary line between the standard white portion A and the black portion C.

Figure 4:
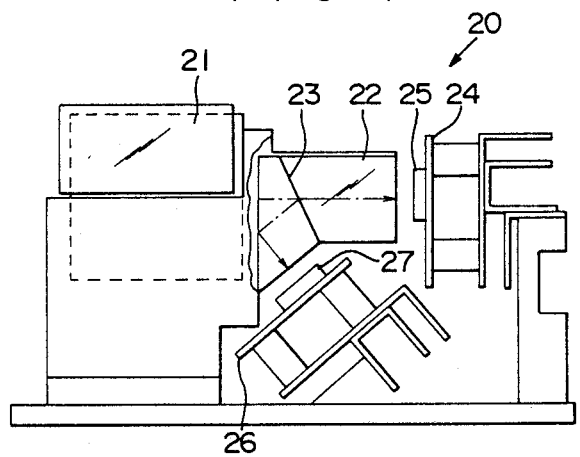
FIG. 4 is an explanatory view showing the arrangement of a reading unit of FIG. 1.

The lens reading unit 20 is constructed, as shown in FIG. 4, a lens 21, a prism 22, a first reading base 24, a red channel (which will be shortly referred to as "R-ch") CCD 25, a second reading base 26, and a cyan channel (which will be shortly referred to as "C-ch") CCD 27. The optical document image transmitted by the first mirror 7 and the mirrors 9 and 9' is converged by the lens 21 and is separated by a dichroic mirror 23, which is disposed in the prism 22, into the R-ch image and the C-ch image, which are focused, respectively, on the light receiving faces of the R-ch CCD 25 mounted on the first reading base 24 and the C-ch CCD 27 mounted on the second reading base 26.

The fluorescent lamps 5 and 6 used are commercially available warm-white type ones for preventing a specified color based on the light source from being stressed or attenuated when the color document is to be read. The fluorescent lamps 5 and 6 are lit by a power supply of high frequency such as 40 kHz so as to prevent any flickering and are warmed by a heater so as to hold their tube walls at a constant temperature and to promote the warm-up.

The image signals outputted from the R-ch CCD 25 and the C-ch CCD 27 are processed by a later-described signal processing unit E. The color signals separated in accordance with the colors of toners are outputted from the signal processing unit E and inputted to the writing unit B.

This writing unit B is constructed, as shown in FIG. 2. A laser beam generated by a semiconductor laser 31 is rotationally scanned by a polygon mirror 32, which is rotated by a drive motor 30, and has its optical path deflected through an F$\theta$ lens 33 and a reflecting mirror 37 so that it is projected on the surface of a photosensitive drum 40 to form a scanning line 39. Numeral 34 denotes an index sensor for detecting the start of the beam scan, and numerals 35 and 36 denote cylindrical lenses for correcting a falling angle. Numerals 38a and 38b, and 38c denote reflecting mirrors for forming a beam scanning optical path and a beam detecting optical path.

When the scan is started, it is detected by the index sensor 34 so that the modulation of the beam by the first color signal is started. The modulated beam scans the photosensitive drum 40 which has been uniformly charged in advance by a charging device 41. A latent image corresponding to the first color is formed on the surface of the drum 40 by the main scan of the laser beam and the auxiliary scan of the rotations of the photosensitive drum 40. This latent image is developed by a developing device 43, which is charged with a red toner, for example, to form a toner image on the surface of the drum 40. The toner image thus obtained passes below a cleaning device 46, which is apart from the surface of the photosensitive drum 40, while being retained on the surface of the drum 40, to enter a subsequent copy cycle. The drum 40 is recharged by the charging device 41.

Next, the second color signal outputted from a signal processing unit E is inputted to the writing unit B and is written like the case of the aforementioned first color signal on the surface of the drum 40 to form a latent image. This latent image is developed by a developing device 44 which is charged with a toner of a second color such as blue. This blue toner image is superposed on the aforementioned red toner image which has already been formed.

Numeral 45 denotes a developing device having a black toner for forming a black toner image on the surface of the drum 40 on the basis of a control signal generated by the signal processing unit. AC and DC biases are applied to the sleeves of those developing devices 43, 44 and 45 so that a jumping development with the two-component toners appears, and an inversion development is conducted in a noncontact manner on the photosensitive drum 40 disposed.

The detail of the developing device 43 will be described with reference to FIG. 3. Reference numeral 43a denotes a toner supply device, numeral 43b a sponge roller, numerals 43c and 43d toner agitating members, numeral 43e a scraper, numeral 43f a developing sleeve, numeral 43g a magnet, numeral 43h a h-cut plate, numeral 43j a resistor, numeral 43k an AC power source, and 43l a DC power source.

The toner supplied from the toner supply device 43a is delivered by the sponge roller 43b and the agitating members 43c and 43d into the developing unit which is composed of the developing sleeve 43f and the developing magnet 43g. On the developing sleeve 43f, there is formed a layer of a developer 43m of a toner and a carrier, which is regulated to have a constant thickness by the h-cut plate 43h and by which is developed the latent image formed on the surface of the photosensitive drum 40. The numeral 43e denotes the scraper for scraping off the developer from the surface of the sleeve 43f after the development. Incidentally, arrow a indicates the moving direction of the developer, and arrow b denotes the rotating direction of the magnet roller. The sleeve 43f is rotated in the same direction as that of the moving direction of the developer.

In case a whiteout occurs at the leading or trailing end of the image due to shortage of developability, it is recommended to change the cut plate 43h into the position of the scraper 43e so that the developer may be moved in the same direction as that of the photosensitive drum 40 by turning the developing sleeve 43f and the developing magnet 43g in the direction opposite to that of the shown arrow.

The AC power source 43k and the DC power source 43l are connected with the sleeve 43f through the resistor 43j to apply a developing bias between the sleeve 43f and the photosensitive drum 40.

Thus, the superposed image of the toner image developed by the first color signal, the toner image by the second color signal and the toner image developed with the black toner is transferred by a transfer electrode 50 to a recording paper 61 which is fed by a feed belt 62 and a feed roller 63 composing the paper feed unit. The transfer paper having the toner images transferred thereto is separated from the photosensitive member by a separating electrode 51 and is delivered to a fixing device 52 to provide a fixed color hard copy.

The cleaning device 46 comes into contact with the photosensitive drum 40 having completed the transfer to clean it with a blade 47 thereby to remove the excess toner from the surface of the photosensitive drum 40. A roller 49 of the cleaning device is provided to remove a small quantity of toner left between the surface of the photosensitive drum 40 and the blade 47 when the blade 47 leaves the surface of the drum 40 for subsequent exposure and development after the end of the cleaning operation. The roller 49 rotates in the direction opposite to that of the photosensitive drum 40 to scrape the contacting portion of the surface of the photosensitive drum 40 thereby to recover the residual toner.

Next, the signal processing unit E for processing the signals read out will be described with reference to FIGS. 4 to 10.

FIG. 4 is a partial section showing the details of the reading unit A of FIG. 1. The document image incident on the lens 21 is separated by the dichroic mirror 23 of the prism 22 into red and cyan images, which are introduced to the R-ch CCD 25 on the first reading base 24 and the C-ch CCD 27 on the second reading base 26, respectively.

Figure 5:
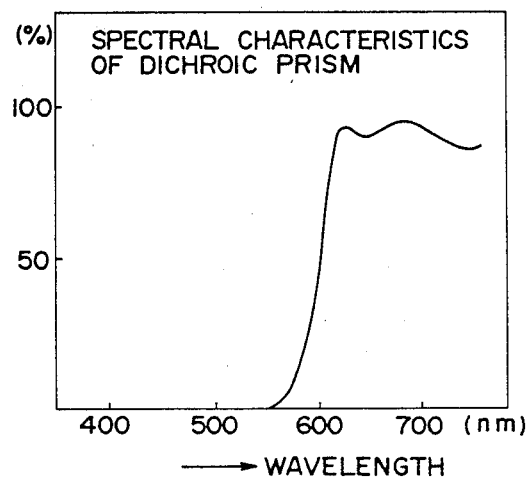
FIG. 5 is a graph showing the spectral characteristics of a dichoric mirror shown in FIG. 4.

Here, the spectral reflection characteristics of the dichroic mirror 23 used for color separation are shown in FIG. 5. In FIG. 5, the ordinate plots the transmissivity (%), and the abscissa plots the wavelength (nm). The red component utilized the transmission, and the cyan component utilized the reflection. In the example of FIG. 5, the transmissivity is about 50% in the vicinity of the wavelength of 600 nm.

Next, the principle for generating color signals from color separating information signals will be described with reference to FIGS. 6 to 10.

The reflected optical image of the document 2 has its red and cyan components separated by the prism 22, and these components are introduced into the R-ch CCD 25 and the C-ch CCD 27, respectively, so that they are converted into electric signals. These electric signals outputted from the R-ch CCD 25 and the C-ch CCD 27 are amplified by amplifiers Amp-R and Amp-C and are then converted by analog-digital converters A/D-r and A/D-c into digital signals, which are extracted as the red component output signal Vr and the cyan component output signal Vc which are normalized by the output value of the standard (i.e., white) color.

Generally speaking, in case two or more image pickup elements are used, these image pickup elements do not always have their document reading positions coincided and are difficult to be mechanically coincided in advance. Specifically, it is difficult to form such that, during the reading operation a position which is read by a picture element of one image pickup element can be read correctly by a corresponding picture element of the other image pickup element.

The relative positional deviations between the two C-ch and R-ch channels are divided into two kinds in the auxiliary and main scanning directions. The auxiliary scanning direction is a direction in which the document and the image pickup element move relatively to each other at the scanning, and the main scanning direction is a direction normal to said auxiliary scanning direction. The conceivable positional deviation in the main scanning direction is given by two kinds of patterns, as shown in FIG. 8(a). The conceivable deviation in the auxiliary scanning direction is given by the pattern shown in FIG. 8(b) and by the pattern in which the R-ch and C-ch are interchanged.

Figure 8:
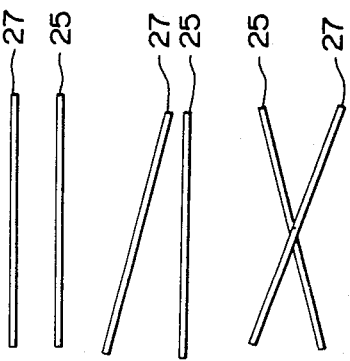
FIGS. 8(a) and 8(b) are views explaining the case in which the CCDs are mutually deviated.
Figure 8:
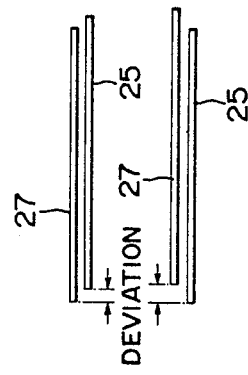

Since the deviations in the main scanning direction and in the auxiliary scanning direction are seriously different in their detecting and correcting methods, as seen from FIG. 8, their detection and correction will be described in the following discussion by dividing them in the main scanning direction and in the auxiliary scanning direction.

First of all, the positional deviation detecting and correcting methods in the main scanning direction will be described with reference to FIGS. 6 and 7.

A main scan alignment correcting circuit 74 detects, in the image pickup scan of the CCD, the signal changes, which occur when the position detecting plate 16 for providing a standard for the correction is scanned from the standard white portion A to the black portion B, by means of a comparator. As a result of these signal changes, a time difference occurs between the R-ch and the C-ch if the main scan alignment deviates. The circuit judges the deviations by finding how much one channel is delayed from the other, for example, by finding that the R-ch is delayed from the C-ch by five picture elements (which are converted from the time difference).

Of line memories 72 and 73, the memory 72 has its circuit constructed such that a write address can be controlled with respect to the number deviations of picture elements. Therefore, channel selectors 71 and 77 are so switched that the signal of the delayed channel is introduced into the memory 72. Address signals for controlling the line memories are generated from address counters A and B and control the writing and reading of the memories. The change-over of the writing and reading is effected by a writing change-over signal from the decoder.

The signal write in the line memory 72 uses the address signal which is delayed by the signal deviation from the write address of the line memory 73. And, the line memories 72 and 73 are read with the common address signal. As a result, the signal read out is corrected to compensate for its delay (or difference) which is caused by the main scan alignment deviation, so that the signals at an identical time in individual time sequence pick up an identical image in case they are in the auxiliary scan alignment.

Next, the two CCD alignment correcting methods in the auxiliary scanning direction will be described in the following.

The line memories 72 and 73 necessary for the auxiliary scan alignment correction are positionally deviated as much as n lines (wherein n denotes an integer) in the auxiliary scanning direction from the R-ch CCD 25 and the C-ch CCD 27. In case these positional deviations are to be subjected to the alignment correction, the line memories have (n+1) lines, one of which is used for a write buffer.

The signals Vr and Vc stored in the line memories 72 and 73 are used by an auxiliary alignment correction unit 75, as will be described in the following, to detect the positional deviations of the R-ch CCD 25 and the C-ch CCD 27 in the auxiliary scanning direction and to correct the deviations (which correction will be referred to as the "alignment correction"). Incidentally, the following description is directed to the case in which the R-ch CCD 25 and the C-ch CCD 27 are composed of 4112 elements and in which the line memories 72 and 73 are 6-line memories.

First of all, the detection of the positional deviations is conducted in the following manner by a reading device control CPU using the signals, which have been subjected to an A/D conversion from the respective output signals of CCDs of the R-ch and C-ch, and the 1-lines address.

Let it be assumed that the image pickup position of the CCD 25 or 27 with respect to the position reference plate 16 be in states shown in FIGS. 12(a) to 12(d). Incidentally, in each of FIGS. 12(a) to 12(d), the abscissa plots the address ($A_0$ to $A_{4112}$) of each picture element of the line CCD 25 or 27, and the ordinate plots the line number ($L_1$ to $L_5$) of the CCD 25 or 27 in the auxiliary scanning direction. As the carriage 4 and the movable mirror unit 8 scan in the auxiliary scanning direction, the image pickup position of the CCD 25 or 27 on the document surface is sequentially moved from $L_1$ to $L_5$, as shown in FIGS. 12(a) to 12(d). The sloped straight line indicates the boundary between the white portion A and the black portion C of the position detecting plate shown in FIG. 11. From the lines $L_1$ to $L_5$ of the line memories 72 and 73, moreover, image information of the five lines is sequentially stored.

Figure 12A:
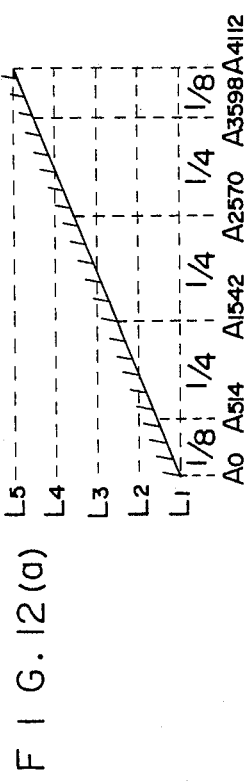
FIGS. 12(a), 12(b), 12(c) and 12(d) are conceptional diagrams explaining a method of detecting the gradient of image pickup elements of the image reading device according to the present invention.

FIG. 12(a) shows the case in which the R-ch CCD 25 or the C-ch CCD 27 is sloped over the five lines after the boundary signal has first arrived (at this time, the scanning point is located at the right end of the black portion C of FIG. 11) and before the last boundary signal arrives (at this time, the scanning point is located at the left end of the black portion C of FIG. 11). Now, let it be assumed that the CCD output signal of the white portion A of the position reference plate 16 be at "1" whereas the CCD output signal of the black portion C be at "0". This state is detected by finding out that the data at the four points of the addresses $A_{514}$, $A_{1542}$, $A_{2570}$ and $A_{3598}$ fall down from "1" to "0" while the lines $L_1$ and $L_2$, $L_2$ and $L_3$, $L_3$ and $L_4$, and $L_4$ and $L_5$ are being scanned.

Figure 12B:
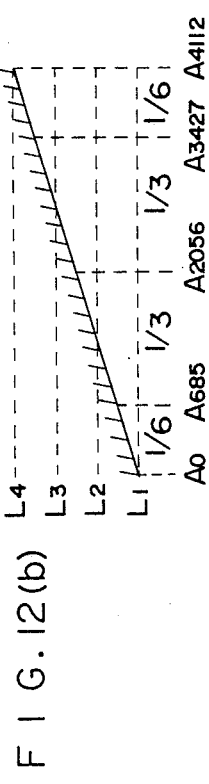
Figure 12C:
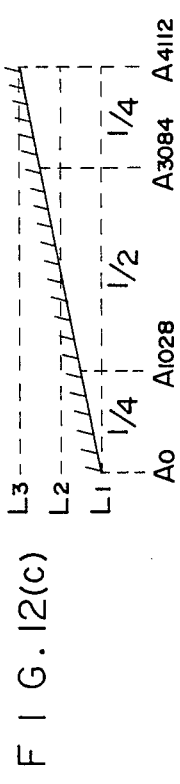
Figure 12D:
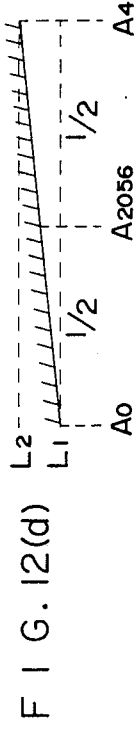
Figure 14:
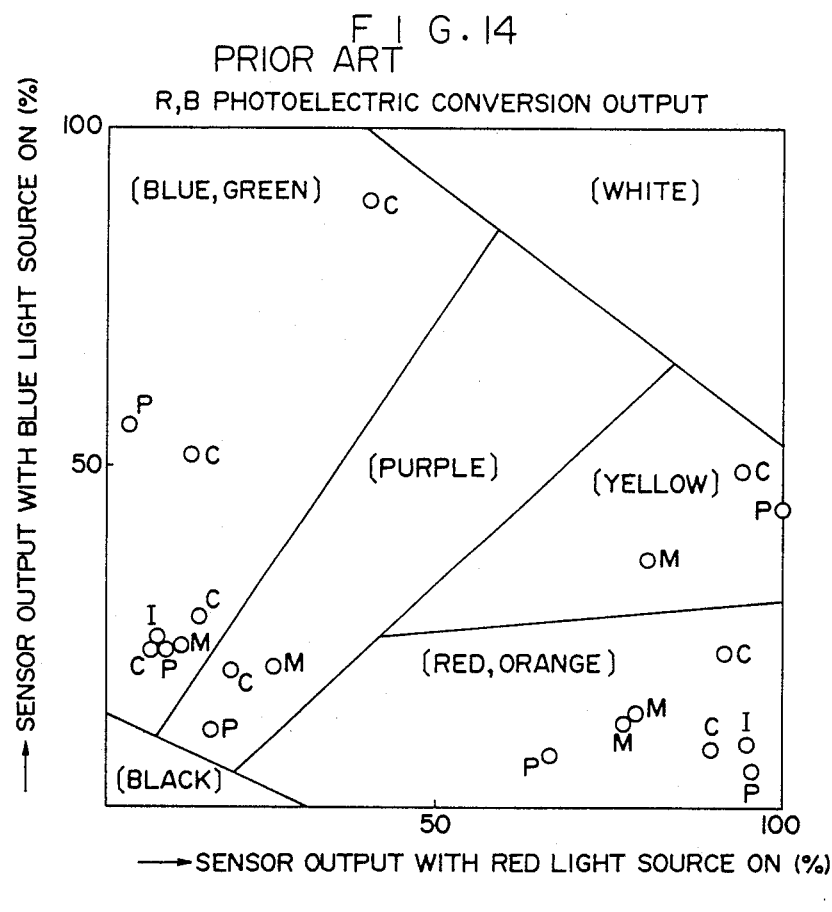
FIGS. 14 and 15 are characteristic diagrams explaining the color signal processing method of the prior art.
Figure 15:
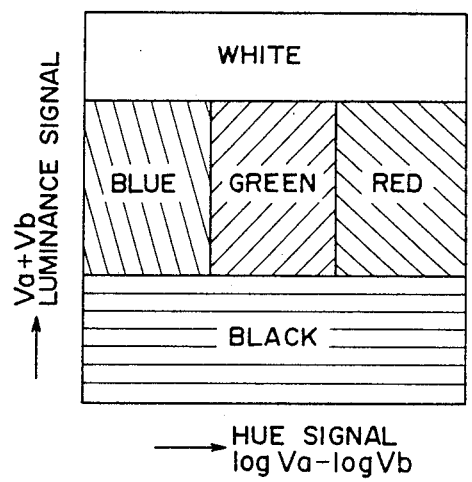

Likewise, that the R-ch CCD 25 or the C-ch CCD 27 is sloped over four lines is detected, as shown in Fig. 12(b), by finding out that the data at the three points of the addresses $A_{685}$, $A_{2056}$ and $A_{3427}$ fall down from "1" to "0" while the lines $L_1$ and $L_2$, $L_2$ and $L_3$, and $L_3$ and $L_4$ are being scanned. Likewise, FIGS. 12(c) and 12(d) show the states in which it is detected that the R-ch CCD 25 or the C-ch CCD 27 is sloped over the three and two lines, respectively.

Figure 6:
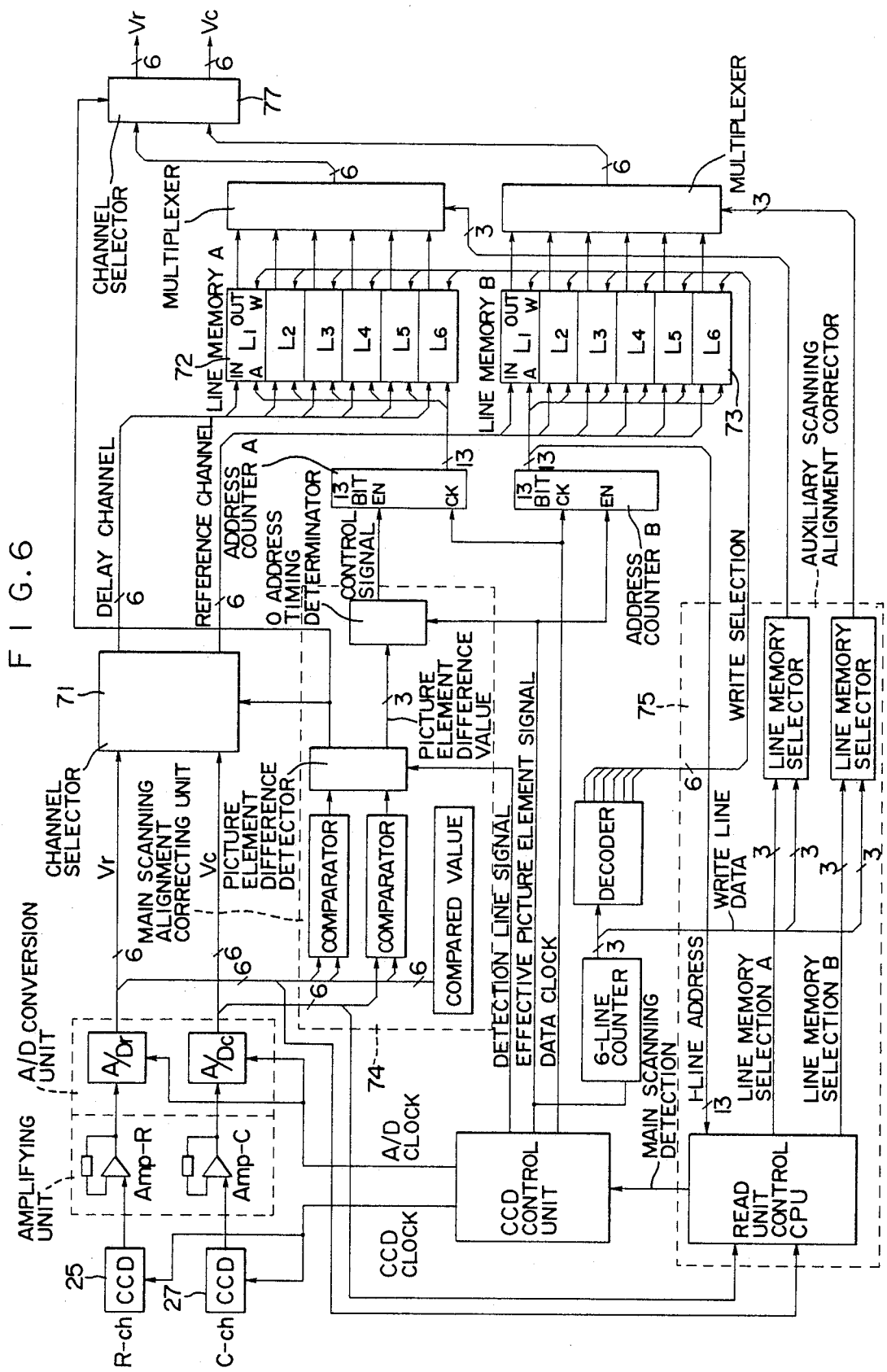
FIGS. 6 and 7 are block diagrams showing the construction of an image reading device according to the present invention.

As a matter of fact, since it is impossible to know in advance how many lines the CCD 25 or 27 is sloped over, the slope is detected by monitoring at all times the output signal of the aforementioned CCD 25 or 27 of a specified address by the reading control CPU shown in FIG. 6 from both the A/D converted output signal of each channel CCD 25 or 27 and the address signal indicating what picture element of the CCD 25 or 27 detects the fall from "1" to "0". If both the boundary lines between the CCD 25 or 27 and the black portion C and white portion A of the reference position detecting plate 16 are straight, two of the above-specified addresses are sufficient. Naturally, even the strain of the CCDs can be detected by monitoring signals of more addresses. That the CCD 25 or 27 is not sloped is detected by finding out that the fall from "1" to "0" occurs all together at all the points of the above-specified addresses.

Thus, the slopes of the CCDs 25 and 27 are detected from the CCD output signals and the address signals. From these detection results, the relative positional deviations between the CCDs 25 and 27 can be known to conduct the alignment correction in the auxiliary scanning direction.

This alignment correction is conducted by changing the reading order when the line memories 72 and 73 are to be read out. This reading order will be described with reference to FIG. 13, for example.

Figure 13A:
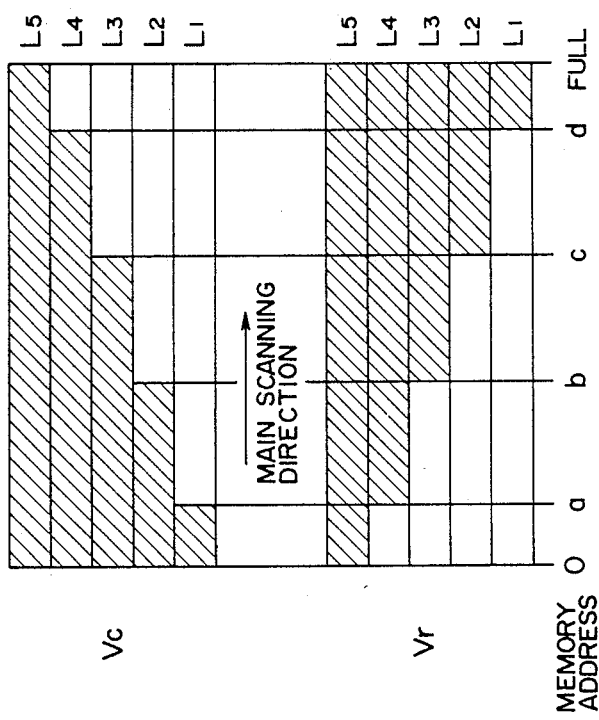
FIGS. 13(a) and 13(b) are memory maps explaining an alignment correcting method of the image reading device according to the present invention.

FIG. 13(a) shows the insides of the line memories 72 and 73, when the image of the position detecting plate 16 is picked up, and depicts that the blank portion A is stored with the signal "1" whereas the hatched portion C is stored with the signal "0". FIG. 13(a) shows that the signal Vc is stored in the line memory 72 such that the C-ch CCD 27 is sloped over the five lines shown in FIG. 12(a) whereas the signal Vr is stored in the line memory 73 such that the R-ch CCD 25 is sloped rightwardly downward opposite to the direction of FIG. 12(a) over the five lines. The detection of the slope of the C-ch CCD 27 over five lines is conducted in response to that signal Vc, and the detection of the slope of the R-ch CCD 25 over five lines is conducted in response to that signal Vr, as has been described above. As a result, the addresses $A_{514}$, $A_{1542}$, $A_{2570}$ and $A_{3598}$ shown in FIG. 12(a) are made to correspond to addresses a to d, and the reading order (as shown in FIG. 13(b)) of the lines $L_1$ to $L_5$ to be described in the following discussion is determined.

The reading operations from the line memories 72 and 73 are conducted in the following manner by the reading device control CPU and the line memory selecting circuit of FIG. 6.

Figure 13B:
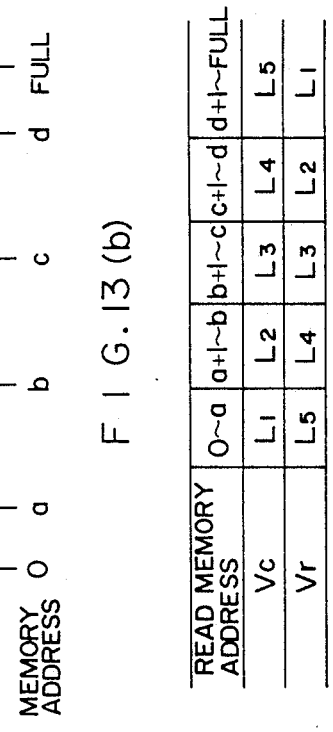

The reading device control CPU monitors the read addresses at all times to output a signal to the line memory selecting circuit so that as shown in FIG. 13(b) the lines $L_1$ and $L_5$ may be read out in response to the signals Vc and Vr, respectively, while the line memories 72 and 73 in the reading operation have the addresses 0 to a. While the addresses are (a+1) to b, on the other hand, the lines $L_2$ and $L_4$ are read out in response to the signals Vc and Vr, respectively. From now on, likewise, the reading operations are repeated all over the surface of the document 2 in the order shown in FIG. 13(b), so that the relative positional deviations are corrected between the CCDs 225 and 27.

The methods of detecting and correcting the positional deviations of the CCDs 25 and 27 have been described hereinbefore. The descriptions thus far made are wholly directed to the positional deviations of the CCDs 25 and 27 with reference to the reference position detecting plate 16. In other cases conceivable, the positions of the CCDs 25 and 27 of the two channels are similarly deviated with respect to the reference position detecting plate 16 or are in parallel with each other although they are sloped with respect to the reference position detecting plate 16. The relative positions of the two channels are absolutely aligned in the former case and are deviated merely in parallel in the latter case. It is therefore expected that either of those processing cases can improve the image pickup quality. According to the present invention, the situations described above can be recognized to avoid any deterioration of the image pickup quality.

The signals Vr and Vc thus read out from the line memories 72 and 73 are subjected to channel conversion by the channel selector 77 and are then converted by a separator color signal generating unit into a sum signal (Vr+Vc) and a color region designating signal Vc/(Vr+Vc), which is obtained by dividing the cyan component Vc by the sum (Vr+Vc), and stored temporarily in the same. Those sum signal and color region designating signal are generated as the signals corresponding to the color and density in a color density signal generating unit using a read only memory (which will be shortly referred to as the "ROM").

Figure 9:
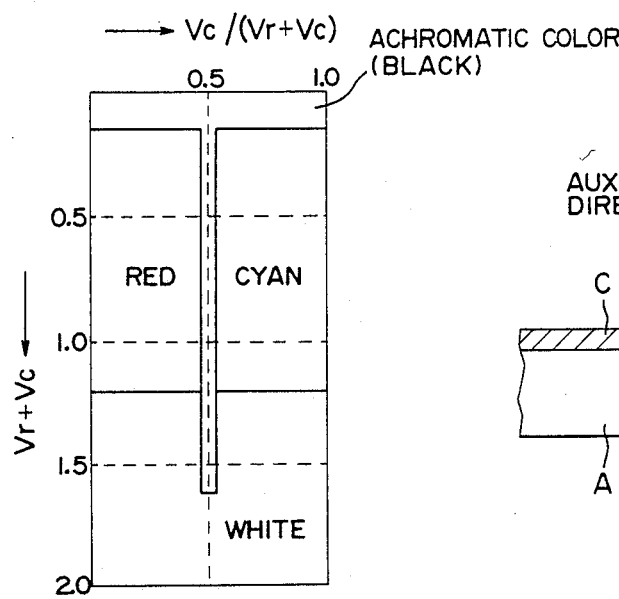
FIG. 9 is an explanatory view showing the color signal processing principle.

The relationship between a color difference signal and a luminance signal is shown in FIG. 9. In the coordinates of FIG. 9, the (Vr+Vc) is plotted as the luminance signal information on the ordinate of the graph whereas the Vc/(Vr+Vc) is plotted as the color difference signal information on the abscissa of the graph. Then, the corresponding position of the input signal is determined in terms of the color and density. The luminance information signal and the color difference signal information have the following natures.

The luminance information signal (Vr+Vc) is the sum of the Vr and Vc ($0 \leq$ Vr, and Vc $\leq 1.0$) and corresponds to the black level=0 and the white level=2.0, and all colors exist between 0 and 2.0. The color difference signal information (Vr/(Vr+Vc), Vc(VR+Vc)) has constant components Vr and Vc contained in the total (Vr+Vc) if the color is achromatic. In other words:

Vr/(Vr+Vc)≈Vc/(Vr+Vc)≈0.5. If the color is chromatic, on the contrary, the color difference signal Vr/(Vr+Vc) or Vc(Vr+Vc) is deviated from 0.5 so that it provides one measure for expressing the hue or saturation of the document, as follows:

Red Colors:

$0.5 < Vr/(Vr+Vc) \leq 1.0$;

and $0 \leq Vc/(Vr+Vc) < 0.5$.

Cyan Colors:

$0 \leq Vc/(Vr+Vc) < 0.5$;

and $0.5 > Vr(Vr+Vc) \leq 1.0$.

By expressing these in coordinates, as shown in FIG. 9, the achromatic colors and chromatic colors (i.e., the red colors and cyan colors) can be accurately separated.

The example of the color zone separations by the above-specified method is shown in FIG. 9, in which:

Vc/(Vr+Vc)=0.5: achromatic colors in the neighborhood;

Vc/(Vr+Vc)<0.5: red colors;

and

Vc/(Vr+Vc)>0.5: cyan colors.

On the other hand, the ordinate (Vr+Vc) corresponds to the reflection density, which can be made to corresponds to the output value.

In order that the color difference signal - luminance signal generating apparatus may generate the color signal and the density signal, the ROM is used to designate the addresses with the (Vr+Vc) and the Vc/(Vr+Vc) to generate the output corresponding to this combination. FIG. 10 shows the ROMs which correspond to the achromatic and chromatic colors (i.e., the red and cyan colors) to produce a binary density signal output at the value "0" or "1".

Figure 7:
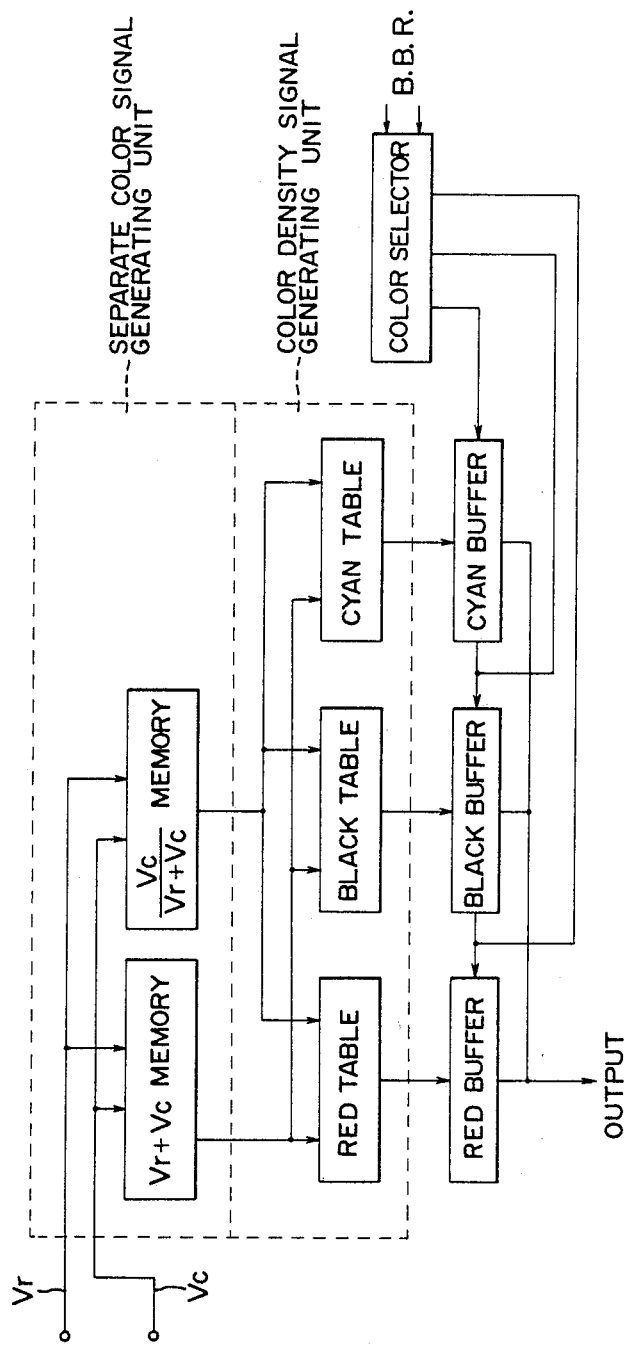
Figure 10A:
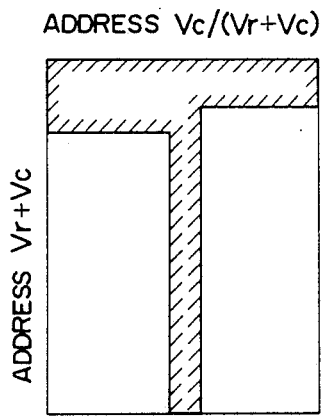
FIGS. 10(a), 10(b) and 10(c) are explanatory views showing examples of a separate color signal generating unit.
Figure 10B:
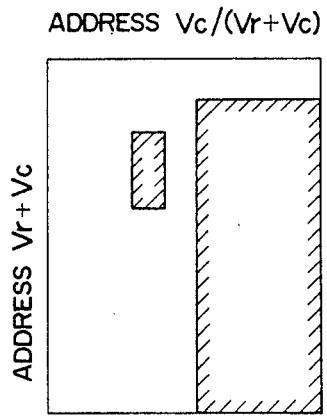
Figure 10C:
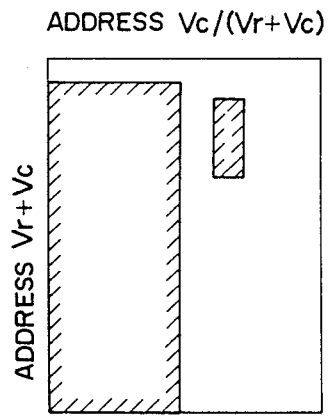

The red table, cyan table and black table in the density signal generating unit of FIG. 7 corresponds to the tables shown in FIGS. 10(a), 10(b) and 10(c). The outputs of the color difference signal Vc/(Vr+Vc) and luminance signal (VR+Vc) generated by the separate signal generating unit in FIG. 6 are simultaneously applied to the red table, black table and cyan table to generate a color signal corresponding one of the achromatic, red and cyan colors.

In FIGS. 10(b) and 10(c), the existence of the outputs over the two zones of the ROM tables is to express the superposed color zones. For example, an intermediate color between the red and cyan colors such as a purple color (i.e., reddish purple to bluish purple) is expressed in accordance with its tone by mixing the red and cyan colors. On the other hand, a brown is expressed by using the black and red colors.

In the case of FIG. 7, the color signal is outputted to act as the luminance signal, too. The document images read out by the CCDs 25 and 27 is expressed by a color signal and a luminance signal generated for each picture element.

In the color selection of the color designating means, a select signal is generated from a blue, black and red designating signal (which will be shortly referred to as the "B.B.R. signal"), which is determined by the signal generated from the control unit of the copying machine body (not shown in the drawing) and the designating signal generated by the switch of the control panel of the copying machine (not shown in the drawing), to selectively designate the red, cyan and black buffers. While the blue developing device corresponding to the red signal is opeating, for example, the signals to the cyan and black buffers are inhibited, but the output signal is fed to the write unit B to light the laser diode so that the image of the red component of the document read is reproduced. The write exposure is conducted for each color in a manner to correspond to each color developing device in operation in response to the B.B.R. signal inputted as the color designating signal.

As has been described hereinbefore, according to the present invention, there is provided an image reading apparatus for reading an image by using two or more image pickup elements, which apparatus comprises detecting means for detecting the relative deviation of the reading positions between said image pickup elements from read outputs, and correcting means for correcting said read outputs in response to the output of said detecting means. As a result, the positional deviation between the image pickup elements of the image reading apparatus can be corrected using the electric circuit.

What is claimed is:

1. An image reading apparatus for reading an image by using at least two image pickup elements, comprising:
   a first and a second image pickup elements elongated substantially along a main scanning direction and including, respectively, means for generating a preselected number of picture element signals for each scan in the main scanning direction;
   means for moving an image to be read and said first and second image pickup elements relative to each other to discrete positions along an auxiliary scanning direction extending substantially perpendicular to said main scanning direction;
   means coupled to the first and second pickup elements for detecting tilting of said first and second pickup elements relative to each other in the auxiliary scanning direction to generate an output signal representing the relative tilt therebetween; and
   means for combining corresponding picture element signals, respectively, from said first and second image pickup elements in response to said output signal of the tilt detecting means to compensate for said relative tilt.

2. An image reading apparatus according to claim 1, wherein the combining means comprises:
   a first memory means arranged in an array having a designated number of rows each corresponding to a scan along the main scanning direction and accommodating said preselected number of picture element signals, each of said rows having addressable positions related to said preselected number of picture element signals;
   a second memory means arranged in an array having a designated number of rows each corresponding to a scan along the main scanning direction and accommodating said preselected number of picture element signals, each of said rows having addressable positions related to said preselected number of picture element signals;
   means for storing the respective preselected number of picture element signals from a scan along the main scanning direction by the first and second image pickup elements into, respectively, addressable positions of rows in the first and second memory means; and
   means for generating a reproduced row by retrieving stored picture element signals while sequencing through said addressable positions by selecting, for each of said addressable positions, a row in said first memory and a row in said second memory based on (a) a particular one of said addressable positions currently being sequenced through, and (b) the output signal of the tilt detecting means.

3. The image reading apparatus of claim 1, further comprising means for detecting deviation in the main scanning direction between said first and second pickup elements and generating a deviation output signal, and means for compensating for said deviation by selectively combining signals from said first and second pickup elements in response to said deviation output signal.

4. An image reading apparatus acccording to claim 3, wherein said deviation detecting means includes a test pattern having an image divided by a line extending in the auxiliary scanning direction into a black portion on one side of the line and a white portion on the other, means for detecting a transition between white and black at each of the positions across said standard plate to generate a set of line signals, and means for determining said deviation from the set of line signals.

5. An image reading apparatus according to claim 1, wherein the combining means comprises:
   a first memory means arranged in an array having a designated number of rows each corresponding to a scan along the main scanning direction and accommodating said preselected number of picture element signals;
   a second memory means arranged in an array having a designated number of rows each corresponding to a scan along the main scanning direction and accommodating said preselected number of picture element signals;
   means for storing the preselected number of picture element signals from each of a plurality of scans by the first image pickup element into said designated number of rows in the first memory means, and for storing the preselected number of picture elements from each of a plurality of scans by the second image pickup element into said designated number of rows in the second memory means; and
   tilt compensating means for retrieving picture element signals from the first and second memory means by combining at least a portion of at least one row of the first memory means with at least a portion of at least one row of the second memory means, and including means for sequentially combining selected portions into which each row in the first memory means has been divided with respective selected portions into which each row in the second memory means has been divided, with the particular rows in the first and second memory means for each combination of the selected portions being determined in accordance with a relationship based on the output signal of the tilt detecting means.

6. An image reading apparatus according to claim 5, wherein the tilt detecting means comprises a test pattern having a transition line extending in the main scanning direction and separating a zone of one brightness from a zone of another brightness, said test pattern being positioned in the path of said first and second pickup elements as they are moved by the moving means in the auxiliary scanning direction, and means for detecting the transition line from a change in the preselected number of picture element signals from a level corresponding to said one brightness to a level corresponding to said other brightness to generate the output signal.

7. An image reading apparatus according to claim 6, wherein the means for storing comprises means for determining a range for each of the selected portions in the rows of the first and second memory means based on said output signal from the tilt detecting means.

8. An image reading apparatus according to claim 7, wherein the means for storing assigns a group of said preselected number of picture elements into said selected portions of the rows in the first and second memory means based on the output signal from the tilt detecting means.

9. An image reading apparatus according to claim 8, wherein said tilt compensating means combines a selected portion of a row in the first memory means with a selected portion of whichever row in the second memory means stores, for the same part of the scan in the main scanning direction, picture element signals of the same level.

10. An image reading apparatus for reading an image by using at least two image pickup elements, comprising:

a first and a second image pickup elements elongated substantially along a main scanning direction and including, respectively, means for generating a preselected number of picture element signals for each scan in the main scanning direction;

means for moving an image to be read and said first and second image pickup elements relative to each other to discrete positions along an auxiliary scanning direction extending substantially perpendicular to said main scanning direction;

means coupled to the first and second pickup means for detecting deviation of said first and second pickup elements, respectively, in the auxiliary scanning direction to generate an output signal representing the deviation of the first and second pickup elements relative to each other;

a first memory means arranged in an array having a designated number of rows each corresponding to a scan along the main scanning direction and accommodating said preselected number of picture element signals, each of said rows having addressable positions related to said preselected number of picture element signals;

a second memory means arranged in an array having a designated number of rows each corresponding to a scan along the main scanning direction and accommodating said preselected number of picture element signals, each of said rows having addressable positions related to said preselected number of picture element signals;

means for storing the respective preselected number of picture element signals from a scan along the main scanning direction by the first and second image pickup elements into, respectively, addressable positions of designated rows in the first and second memory means; and means for generating a reproduced row by retrieving stored picture element signals while sequencing through said addressable positions currently being sequenced through, a row in said first memory and a row in said second memory based on (a) a particular one of said addressable positions currently being sequenced through, and (b) the output signal of the deviation detecting means.

* * * * *